3 Sheets—Sheet 1.
A. LUCKHAUPT.
Machines for Dressing Staves.
No. 197,521. Patented Nov. 27, 1877.
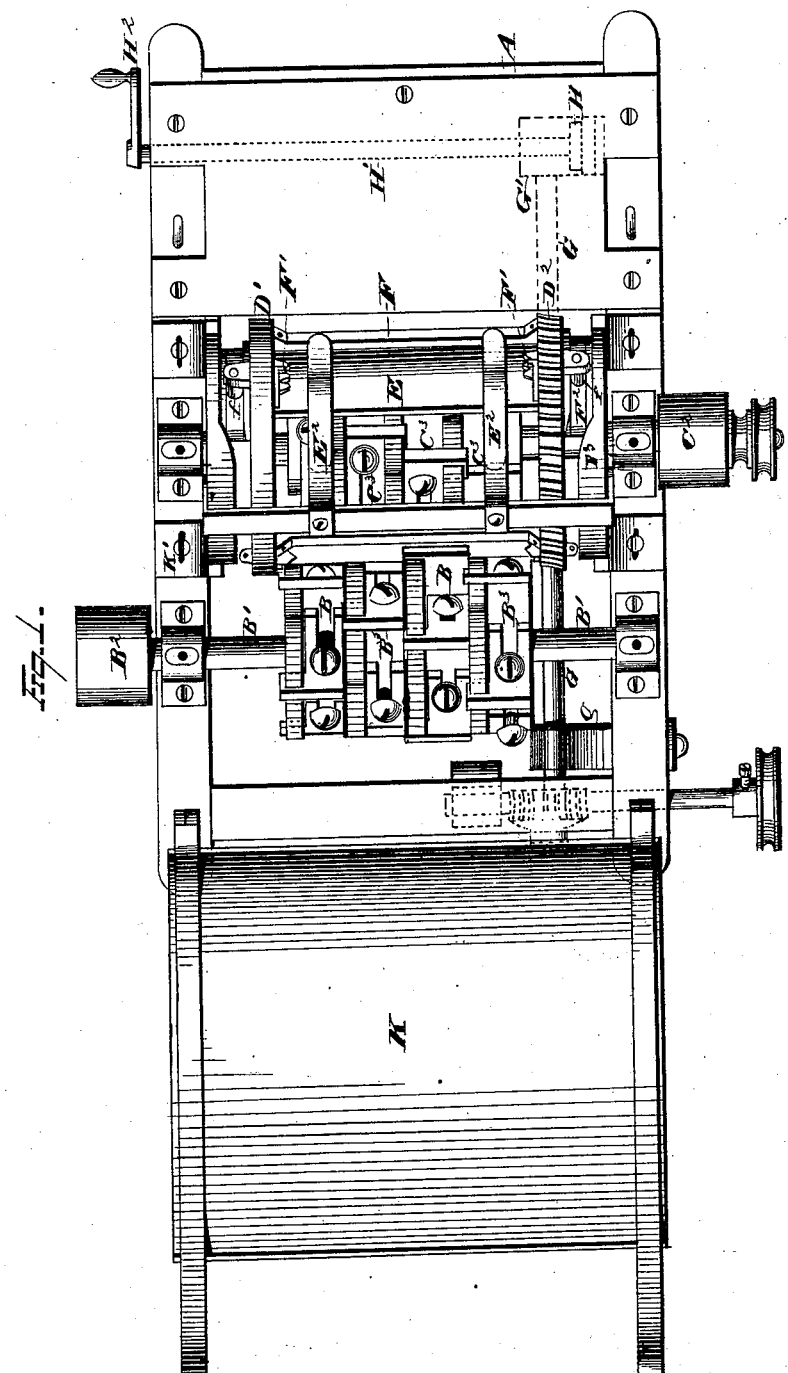
WITNESSES
INVENTOR
Adam Luckhaupt
By Leggett & Leggett
ATTORNEY
N. PETERS, PHOTO-LITHOGRAPHER, WASHINGTON, D.C.

3 Sheets—Sheet 2.
A. LUCKHAUPT.
Machines for Dressing Staves.
No. 197,521. Patented Nov. 27, 1877.
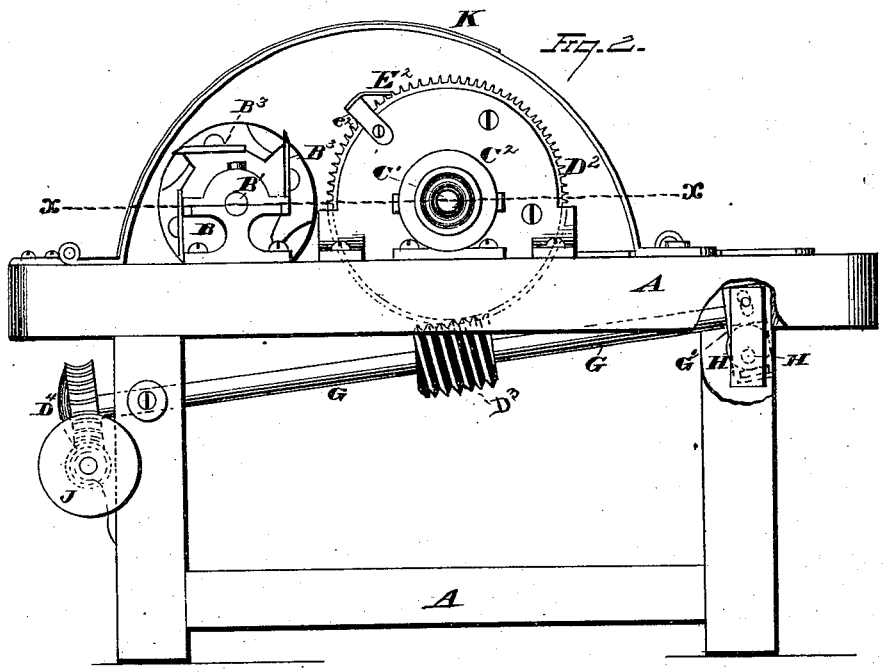
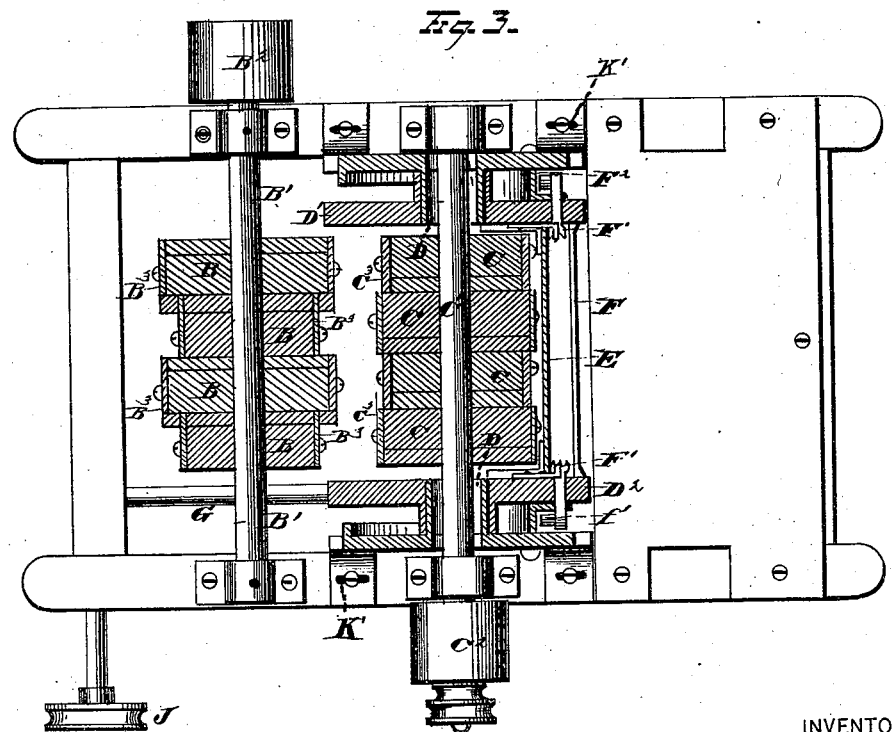
WITNESSES
Ed. F. Nottingham
A W Bright
INVENTOR
Adam Luckhaupt
By Leggett and Leggett
ATTORNEYS.

3 Sheets—Sheet 3.
A. LUCKHAUPT.
Machines for Dressing Staves.
No. 197,521. Patented Nov. 27, 1877.
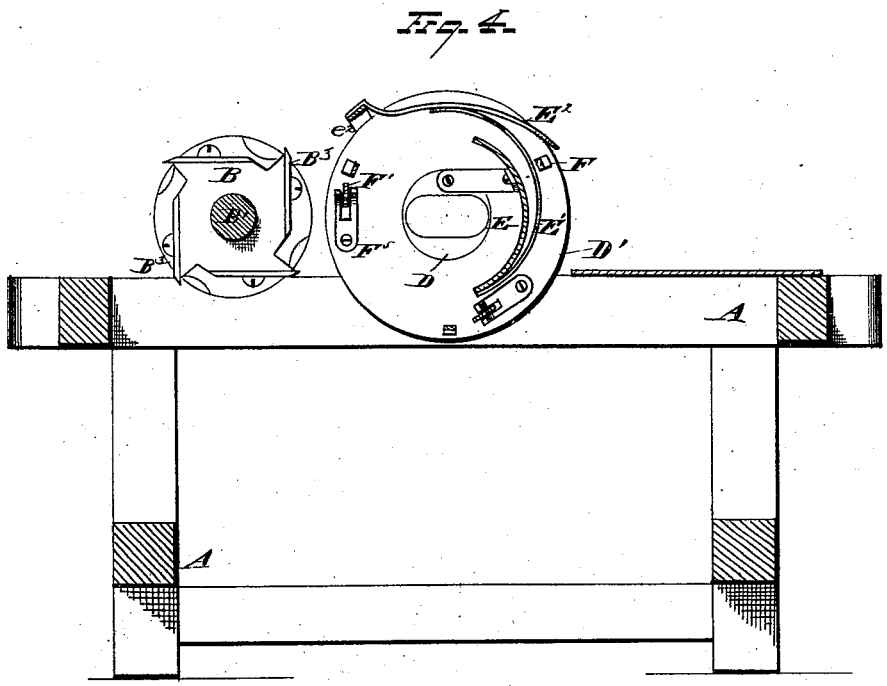
WITNESSES
INVENTOR

UNITED STATES PATENT OFFICE.

ADAM LUCKHAUPT, OF COLUMBUS, OHIO.

IMPROVEMENT IN MACHINES FOR DRESSING STAVES.

Specification forming part of Letters Patent No. 197,521, dated November 27, 1877; application filed October 13, 1877.

*To all whom it may concern:*

Be it known that I, ADAM LUCKHAUPT, of Columbus, in the county of Franklin and State of Ohio, have invented certain new and useful Improvements in Machines for Dressing Staves; and I do hereby declare the following to be a full, clear, and exact description of the invention, such as will enable others skilled in the art to which it pertains to make and use it, reference being had to the accompanying drawings, which form part of this specification.

My invention relates to a new improvement in stave-machinery designed for dressing the stave upon its outer and inner surfaces.

My invention consists in the several parts and combination of parts, as fully described and claimed.

In the drawing, Figure 1 is a plan view of a machine embodying my invention, with the top removed. Fig. 2 is a side elevation, with the top in place. Fig. 3 is a section by a plane containing the line $x\ x$ of Fig. 2, and the axis of the inclosed revolving cutter. Fig. 4 is a view showing the eccentric arrangement of the revolving reel which carries the staves, and the inclosed revolving cutters, and the relative arrangement therewith of the guard and adjusting-springs.

A is a suitable frame-work. B is a revolving cutter-head, resting on the shaft $B^1$, and operated by any suitable connection, $B^2$, with the power. C is another revolving cutter-head connected with the shaft $C^1$, and with the power by any suitable pulley or other mechanism, $C^2$. $B^3\ C^3$ are the knives upon the revolving cutters.

Upon the same shaft with the revolving cutter-head C, and embracing the same eccentrically, are short collars D, which form the bearing of the revolving reel $D^1$, within which the cutter-head C revolves.

The object of standing the cutter-head C eccentrically within the reel $D^1$ is that the revolving cutter-heads B and C may both pass in proper contact with the stave, and that the cutter-head $C^1$ shall be sufficiently far from the position where the stave enters that a shield or guard, E, may be supported within the reel $D^1$, and adjacent to the operator.

$D^2$ is a worm-gear attached to, and, in the instance shown in the drawing, forming one of the heads of the reel. This meshes into a worm, $D^3$, which, in turn, is operated by a worm-gear mechanism, $D^4$, which latter is connected with the power.

This method of driving the reel $D^1$ is not an essential feature of my invention, as it may be driven in any other suitable way, the one shown being such a means as will answer every purpose.

F are cross-pieces, which unite the two heads of the reel $D^1$. They also serve, at the same time, to support the stave as it is placed on the reel. $F^1$ are dogs, which serve to clutch the stave before it reaches the knives, and to hold it in position until the knives cease their action upon it. The dogs $F^1$ have projections $f'$, which may or may not be provided with anti-friction rollers. These projections $f'$ extend down toward the axis of the reel sufficiently far to run within a cam-groove, $F^2$. The supporting-frame A is also provided with cams $F^3$. The object of the cam $F^3$ and cam-grooves $F^2$ is to drive the dogs $F^1$ into and to release them from the ends of the stave at the proper time.

$E^1$ are springs attached to the guard E or to the other stationary parts of the frame. $E^2$ are corresponding springs bearing upon the springs $E^1$ and attached to a stationary cross-piece, $e^2$.

Having described the invention in outline, its operation is as follows: The machine is set in operation, the two cutters revolving very rapidly and the reel $D^1$ revolving at a slow rate. The operator takes the stave to be dressed and places it with its edge on the cross-bar F. The reel $D^1$ carries it forward between the springs $E^1\ E^2$. These springs bring the stave to its exact proper position within the reel. While so held by the springs the reel in moving forward will bring the projections or shanks $f'$ of the dogs $F^1$ against the cams $F^3$. These cams drive the dogs $F^1$ into the ends of the stave, and they are not permitted to retract until after they have carried the stave forward between the knives.

The knives on the revolving cutter-head C dress the outer surface of the stave to its proper contour, while the knives on the revolving cutter-head D dress the inner surface of the stave to its proper contour. The stave is then carried forward until the shank $f'$ of the dogs $F^1$ are caught by the cam-grooves $F^2$. These cams operate to withdraw the dogs $F^1$ and drop the stave out beneath the machine, when it is borne off.

The reel $D^1$ is supplied with a number of cross-bars, F, and dogs $F^1$, so that the operator may feed the staves as rapidly as he can handle them. The knives $B^3$ upon the revolving cutter-head B are arranged preferably as shown in the drawing, and they are made to overlap each other substantially as shown, so that there may be no point upon the stave that is not thoroughly dressed. The knives $C^3$ are arranged in like manner upon the revolving cutter-head C. The knives $C^3$, which dress the outer surface of the stave, are arranged, preferably, to cut the stave straight upon its outer face; but this arrangement may be modified, if desired.

The knives, it will be observed, are all fixed on the cylinder in such manner that they may be readily sharpened without removing them from their supports, if desired.

By the arrangement of the mechanism for holding and cutting the staves here shown, it will be readily observed that the stave is cut or dressed in the direction across the grain of the wood; and herein consists an important feature of this invention, as the result is much superior to that of machines dressing the stave in the line with the grain of the wood. It is therefore desirable that the reel $D^1$ may be temporarily stopped without disturbing the revolving cutters. Any suitable mechanism may be employed for this purpose which will throw the reel into or out of gear with the driving machinery at will.

The device shown in the drawing is as follows: G is a shaft, carrying the worm $D^3$, and the worm-gear $D^4$ at the other end, and supported in a movable box at J, so as to be horizontally pivoted at that point. At its other end the shaft G is supported by a frame-work, G', this frame-work being in the nature of a yoke, within which the eccentric H on the shaft $H^1$ operates. $H^2$ is a crank.

Now, the reel $D^1$ is moved by the power applied at the pulley J. This operates the worm-gear mechanism $D^3$, which, in turn, through the medium of the worm-gear $D^2$, operates the reel $D^1$. In order to throw the worm-gear $D^2$ into gear with the reel $D^1$, it is only necessary to lift the shaft G by turning the crank $H^2$. A further turn of the crank will throw it again out of gear, the shaft G turning about its horizontal pivot at J sufficiently to throw the worm-gear $D^2$ in or out of gear without throwing the mechanism at $D^2$ out of gear.

It is apparent that by properly locating the pivot J both worm-gears might simultaneously be thrown out of gear.

It is understood that the particular means for throwing the reel $D^1$ in or out of gear is not an essential part of my invention, as there are many ways of accomplishing the same result.

K is a cover that shields the machinery and serves to guide away the shavings and choppings of the knives. $F^5$ are strippers, so located with respect to the dogs $F^1$ that as the dogs are withdrawn from the ends of the stave the strippers will effectually release the stave and prevent it from clinging to either dog. K' are slots for facilitating the ready adjustment of one cutter-head nearer to or farther from the other, or for a similar adjustment of the reel or the cam-grooves $F^2$ or cams $F^3$.

What I claim is—

1. In a stave-cutting machine, the combination, with the revolving cutter-head for dressing the outer surface of the stave and the revolving cutter-head for dressing the inner surface of the stave, of the revolving reel adapted to support two or more staves and carry them successively between the said cutter-heads, substantially as described.

2. The combination, with the revolving cutter-head for dressing the outer surface of the stave and the revolving cutter-head for dressing the inner surface of the stave, of the reel adapted to have a continuous revolution, said reel being formed with the two vertical heads connected by cross-pieces, substantially as described.

3. The combination, with the revolving reel and the dogs carried thereby, of the stationary cams, the same being formed as described, whereby the said dogs are automatically fastened into the ends of the stave under the operation of the machine, substantially as described.

4. The combination, with the revolving reel and the dogs carried thereby, of the cam-grooves formed in the stationary frame, the same being adapted to operate as described, whereby the said dogs release the stave at the proper time for discharging the same, substantially as and for the purpose described.

5. The combination, with the stave-supporting reel and the dogs, of rests or bars F, substantially as and for the purposes described.

6. The combination, with the revolving reel, of the springs $E^1$ and $E^2$, formed to overlap each other, and adapted, as described, to clamp the stave between them preparatory to the latter being dogged, substantially as and for the purpose described.

7. The combination, with the revolving reel, of springs $E^1$, secured to the guard or other stationary part of the frame and the springs $E^2$, the latter being attached to a stationary cross-piece and bearing upon said springs $E^1$, substantially as and for the purpose described.

8. The combination of the reel, the bar for supporting the stave, the springs $E^1$ $E^2$ for adjusting it, and the dogs $F^1$ for clutching it, substantially as and for the purposes described.

9. The combination, in a stave-cutting machine, of a horizontal revolving cutter-head for dressing the outer surface of the stave, a horizontal revolving cutter-head for dressing the inner surface of the stave, and a revolving reel constructed to revolve around one of the revolving cutter-heads, and to feed the staves to the knives, substantially as and for the purposes described.

10. The combination, with the stave-feeding reel, of the revolving cutter-head inclosed within it eccentrically, and a stationary curtain or shield, E, substantially as and for the purposes described.

11. The combination, with the reel having the periphery of one of its heads suitably cogged, of the shaft provided a worm or endless screw, and adapted to be engaged therewith or disengaged therefrom, substantially as and for the purpose described.

12. The combination, with the reel $D^1$ and the worm-gear $D^2$, of the eccentric H, for releasing and engaging them at will, substantially as and for the purposes described.

13. The combination, with dogs $F^1$, of strippers $F^5$, substantially as described.

14. In a stave-cutting machine, the combination, with the bearings made with the elongated slots $K'$, of the cutter-head shaft journaled in the bearing-collars D, the whole being formed and adapted to operate substantially as described.

In testimony whereof I have signed my name to this specification in the presence of two subscribing witnesses.

ADAM LUCKHAUPT.

Witnesses:
  F. TOUMEY,
  W. E. DONNELLY.